United States Patent [19]
Yamamoto

[11] Patent Number: 5,289,511
[45] Date of Patent: Feb. 22, 1994

[54] LIQUID-METAL COOLED NUCLEAR REACTOR

[75] Inventor: Ken Yamamoto, Tsuruga, Japan

[73] Assignee: Doryokuro Kakunenryo Kaihatsu Jigyodan, Tokyo, Japan

[21] Appl. No.: 987,219

[22] Filed: Dec. 8, 1992

[30] Foreign Application Priority Data

Dec. 9, 1991 [JP] Japan ................... 3-324141

[51] Int. Cl.⁵ ............................................. G21C 13/00
[52] U.S. Cl. ................................. 376/293; 376/290; 376/312; 376/404
[58] Field of Search ................... 376/285–290, 376/293, 402–406, 461, 312

[56] References Cited

U.S. PATENT DOCUMENTS

| | | | |
|---|---|---|---|
| 4,045,286 | 8/1977 | Blum et al. | 376/288 |
| 4,061,534 | 12/1977 | Jackson | 376/289 |
| 4,102,739 | 7/1978 | Sayre | 376/287 |
| 4,295,934 | 10/1981 | Robin | 376/403 |

*Primary Examiner*—Daniel D. Wasil
*Attorney, Agent, or Firm*—Wenderoth, Lind & Ponack

[57] ABSTRACT

In a liquid-metal cooled nuclear reactor using liquid metal as a coolant and having vessels and pipings for accommodating the liquid metal coolant, at least pat of the region surrounding a coolant pressure boundary defined at outer wall surfaces of the vessels and piping is occupied by a mass of a solidified liquid metal. The solid mass (e.g. sodium) actually forms the coolant pressure boundary so that it is not so necessary to ensure the soundness of the steel walls of the vessels and pipings which accommodate the liquid metal coolant.

5 Claims, 2 Drawing Sheets

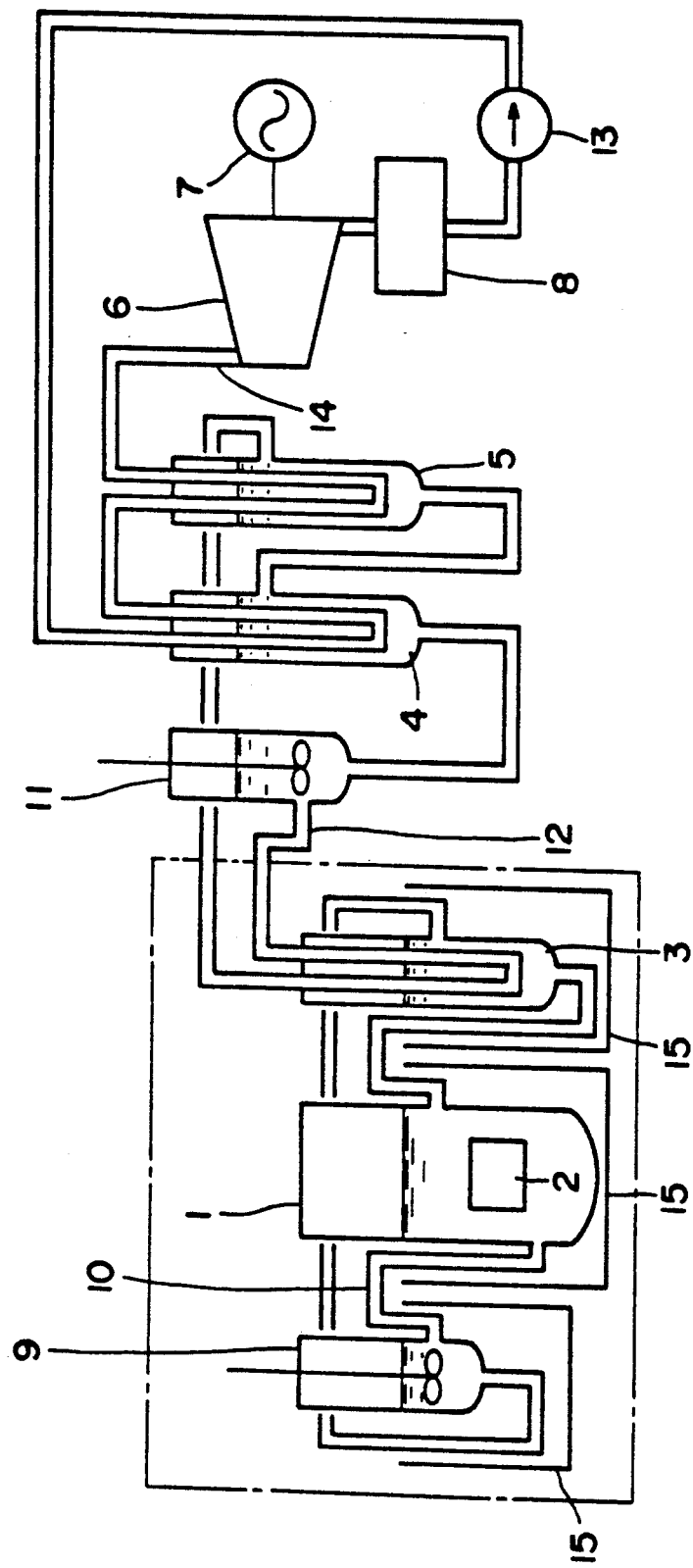
FIG. 2-PRIOR ART

LIQUID-METAL COOLED NUCLEAR REACTOR

BACKGROUND OF THE INVENTION

The present invention relates to a nuclear reactor used for power generation, research and the like, and in particular, a liquid-metal cooled nuclear reactor using liquid metal coolant such as sodium wherein the integrity or soundness of its coolant pressure boundary is improved and maintained.

A fast breeder reactor using liquid sodium as a coolant will be explained as a typical example of liquid-metal cooled reactors. FIG. 2 is a schematic diagram illustrating the fast breeder reactor "Monju", wherein heat generated in a reactor vessel 1 including a reactor core 2 therein is transferred to a primary sodium coolant contained in the reactor vessel 1. Heat is then transferred to a secondary sodium coolant via an intermediate heat exchanger 3, and further to water in an evaporator 4 to generate steam therein. The steam is supplied, via a superheater 5, to a turbine 6 to drive a generator 7, thus generating electricity. The steam coming out of the turbine 6 is condensed into water in a condenser 8.

The primary sodium system (encircled by single-dot and dash lines in FIG. 2) is composed of a primary sodium system pump 9 and a primary sodium system main piping 10 which in combination circulate primary sodium coolant through the reactor vessel 1 and the intermediate heat exchanger 3.

A secondary sodium system is composed of a secondary sodium system pump 11 and a secondary sodium system main piping 12 which in combination circulate secondary sodium coolant through the intermediate heat exchanger 3, the evaporator 4, and the superheater 5. Further, a water/steam system is composed of a water feed pump 13 and a water/steam main piping 14 which in combination circulate the water/steam through the evaporator 4, the superheater 5, the turbine 6 and the condenser 8. The primary sodium system is usually installed in a nuclear reactor containment vessel, whereas the secondary sodium system and the water/steam system are installed outside the reactor containment facility.

The coolant pressure boundary, i.e. the boundary between the vessels and piping containing the primary or secondary sodium coolant and the external region thereof, is extremely important in terms of safety. Therefore, in the design and manufacture of such a nuclear reactor as described above, it is imperative to be very careful not to allow the sodium to leak from the vessels and the piping, and the materials of these vessels and pipings should be of steel having a great strength at high temperature and having excellent resistances to sodium corrosion, neutron irradiation, thermal shock and the like.

Further, in order to better deal with an emergency that would occur should there be leakage across the coolant pressure boundary, there have been provided with various precautionary measures such as the installation of the main piping 10 at higher locations, the arrangement of guard vessels 15 around the reactor vessel 1, the intermediate heat exchanger 3 and the primary sodium system pump 9, and further substitution of nitrogen for the ambient air. These countermeasures, however, more or less compromise the economical efficiency of the sodium-cooled reactor.

SUMMARY OF THE INVENTION

In view of the above, it is an object of the present invention to provide a liquid-metal cooled nuclear reactor which is capable of alleviating the demand for the soundness of the steel walls of the vessels and the piping which accommodate the sodium coolant.

The present invention provides an improved liquid-metal cooled nuclear reactor using liquid metal as a coolant and having a coolant pressure boundary which is the boundary between the vessels and piping accommodating the liquid metal coolant and an external region thereof. The improvement according to the present invention is characterized in that the entire or part of a region surrounding the coolant pressure boundary is occupied by a mass of a solidified liquid metal.

In the present invention as described above, the vessels and the piping containing therein the liquid metal are embedded and sealed in the mass of solidified liquid metal, whereby this solid mass of solidified liquid metal forms the pressure boundary. As result, the burden for ensuring the soundness of the walls of the vessels and the piping can be substantially reduced.

BRIEF DESCRIPTION OF THE DRAWINGS

FIG. 2 is a schematic diagram of a fast breeder reactor as a typical example of a conventional liquid-metal cooled nuclear reactor.

PREFERRED EMBODIMENTS OF THE INVENTION

Figure 1:
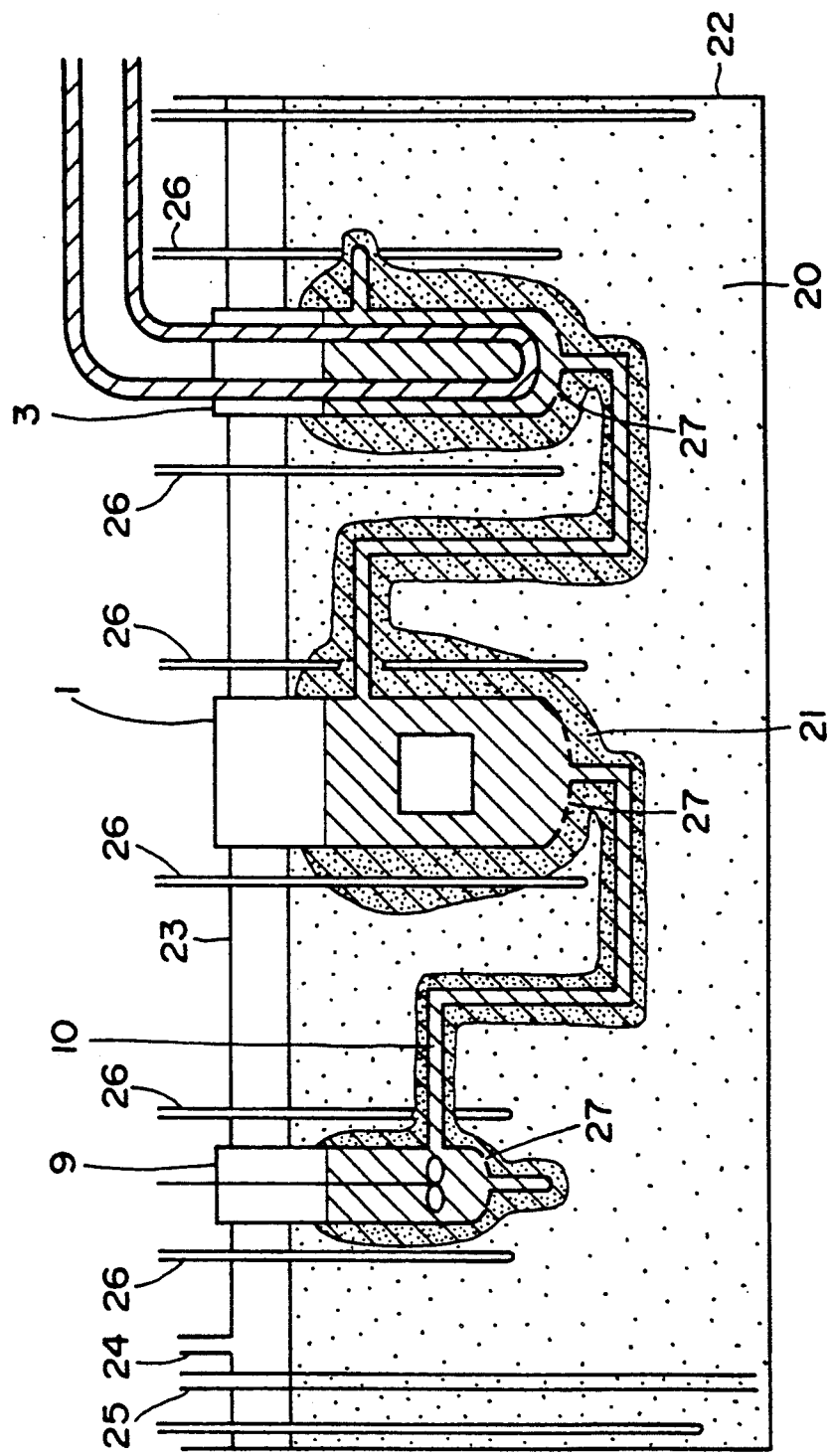
FIG. 1 illustrates an embodiment of the present invention.

FIG. 1 shows a fast breeder reactor in which the present invention is applied to the primary sodium system. A reactor vessel 1, an intermediate heat exchanger 3, a primary sodium system pump 9 and a primary sodium system main piping 10 are all embedded and sealed in a solid sodium mass 20 solid at room temperature. High temperature liquid sodium serving as a coolant flows through the reactor vessel 1 and the piping 10. The liquid sodium coolant flowing out of the reactor vessel 1 returns to the primary sodium system pump 9 via the intermediate heat exchanger 3, and is recirculated again into the reactor vessel 1. The piping from the intermediate heat exchanger 3 to the primary sodium system pump 9 is not shown here since it is disposed in a part of the sodium mass 20 where the cutting plane of the section of this figure does not pass.

In region 21 surrounding the reactor vessel 1, the pump 9 and the piping 10 through which the liquid sodium flows, the sodium stays in a molten state as its temperature is above its melting point. Although the solidified sodium mass 20 is contained in an outer container 22 with an upper cover 23, the outer container 22 does not need to have a great strength, but only needs to have water-tightness because the solidified sodium mass 20 itself has a sufficient strength.

The space between the upper cover 23 and solid sodium mass 20 is filled with an inert gas. An inert gas inlet pipe 24 and a liquid sodium inlet pipe 25 are provided through the upper cover 23.

A plurality of ventilation pipes 26 extend into the solid sodium mass 20 from the outside thereof in appropriate positions in the vicinity of the vessels (reactor vessel 1, intermediate heat exchanger 3 and pump 9) and the pipings (main piping 10 and pipings connecting the vessels). By controlling the temperature and velocity of ventilation air to be supplied to these ventilation pipes 26, the thickness of the molten sodium region 21 in the vicinity of the external of the vessels, and pipings can be maintained at a constant value despite transient changes in the temperature of liquid sodium flowing through the vessels and piping of the primary sodium system.

Such an arrangement as described above enables the solid sodium mass 20 to actually form the coolant pressure boundary, so that the walls of the vessels and piping can be no more considered as a part of the coolant pressure boundary. Thus, the reactor vessel 1, the intermediate heat exchanger 3, the primary sodium system pump 9 and the like can be provided with sodium introducing orifices 27 through which liquid sodium can flow. By providing such sodium introducing orifices 27, both the inside and the outside of the primary sodium system can be filled with liquid sodium concurrently. That is, by supplying liquid sodium into the outer container 22 through the liquid sodium inlet pipe 25, it is filled with liquid sodium, and thereafter the reactor vessel 1, the intermediate heat exchanger 3, the primary sodium system pump 9, and further the piping 10 connecting therebetween are filled with liquid sodium through respective sodium introducing orifices 27. After the supplying of sodium is completed, by controlling the temperature and velocity of ventilation air to be supplied from the ventilation pipes 26, the liquid sodium in the region outside the primary sodium system can be solidified to create such a state as shown in FIG. 1. The sodium introducing orifices 27 may be formed in both the vessels and the piping.

Further, the effects of a diffusion type cold trap can be produced by providing the sodium introducing orifices 27. Namely, impurities such as sodium oxide in the sodium coolant are transferred through the sodium introducing orifices 27 out of the primary sodium system into the molten sodium region 21 surrounding the primary sodium system, and are precipitated there in the lowest temperature portion, i.e., at the interface between the molten sodium region 21 and the solidified sodium mass 20.

As can be understood from the foregoing, since the solid sodium mass surrounding the entire portion of the sodium coolant system forms the coolant pressure boundary, it is not necessary for the vessel walls or piping walls to ensure the integrity of the boundary. Therefore, it also is not necessary to install guard vessels around the respective vessels, or to dispose the main piping at higher locations. Further, it becomes possible to attach bellows to the main piping, as required.

Still further, by providing sodium introducing orifices in the vessel walls and the piping walls which delimit the coolant pressure boundary, not only does it become easier to bury the sodium coolant system in the solid sodium mass, but it also becomes possible to transfer impurities in the coolant sodium to other regions outside the coolant system to allow them to precipitate there. This contributes to reducing the burden imposed on a coolant purifier system, or even allows the purifying system to be eliminated.

Although the above description has been limited to the case where sodium is utilized as the liquid metal, the present invention can employ other liquid metal coolants which are solid at room temperature such as potassium, NaK, and lithium.

Further, the liquid metal in the cooling system and the solid metal mass outside the cooling system may be of different kinds of metals as long as their compatibility can be maintained.

What is claimed is:

1. In a liquid-metal cooled nuclear reactor using a liquid metal as a coolant and having a coolant circulation system including a plurality of vessels and piping connecting the vessels to form a loop through which the coolant is circulated, the improvement comprising: an outer container in which the vessels and the piping are contained; a mass of solidified liquid metal, of the same metal as that of said coolant, filling a portion of said outer container; at least a portion of the vessels and the piping being embedded in and sealed by said mass; a major part of the liquid metal filling said outer container remaining solid during normal operation of the reactor, and a minor part of the liquid metal substantially less than that of said major part becoming molten adjacent outer wall surfaces of the vessels and the piping during normal operation of the reactor due to heat given off by the coolant circulating through said at least a portion of the vessels and the piping of the coolant circulation system.

2. The improvement in a liquid-metal cooled nuclear reactor as claimed in claim 1, wherein the vessels or both the vessels and the piping have small openings extending through the walls thereof from the interior to the exterior of the vessels or both the vessels and the piping, and through which openings the liquid metal coolant can pass.

3. The improvement in a liquid-metal cooled nuclear reactor as claimed in claim 1, wherein a plurality of ventilation pipes extend from the exterior of the mass of solidified liquid metal into said mass and are each located in said mass adjacent the part of the liquid metal that is molten adjacent outer wall surfaces of the vessels and the piping.

4. In a liquid-metal cooled nuclear reactor using a liquid metal as a coolant and having a primary coolant system including a reactor vessel in which the core of the reactor is contained, an intermediate heat exchanger, primary coolant system main piping connecting the reactor vessel and the intermediate heat exchanger, and a primary coolant system pump which circulates the liquid metal coolant through the primary coolant system, the improvement comprising: an outer container in which the reactor vessel, the pump, the intermediate heat exchanger and the piping are contained, a mass of solidified liquid metal, of the same metal as that of said coolant, filling a portion of said outer container; the reactor vessel, the pump, the intermediate heat exchanger and the piping being embedded in and sealed by said mass; a major part of the liquid metal filling said outer container remaining solid during normal operation of the reactor, and a minor part of the liquid metal substantially less than that of said major part becoming molten adjacent outer wall surfaces of the reactor vessel, the pump, the intermediate heat exchanger and the piping during normal operation of the reactor due to heat given off by the coolant circulating through the primary coolant system.

5. The improvement in a liquid-metal cooled nuclear reactor as claimed in claim 4, wherein the vessels or both the vessels and the piping have small openings extending through the walls thereof from the interior to the exterior of the vessels or both the vessels and the piping, and through which openings the liquid metal coolant can pass.

* * * * *